United States Patent
Haselden et al.

(10) Patent No.: US 7,591,021 B2
(45) Date of Patent: Sep. 15, 2009

(54) OBJECT MODEL DOCUMENT FOR OBFUSCATING OBJECT MODEL THEREIN

(75) Inventors: J. Kirk Haselden, Issaquah, WA (US); Sergei Ivanov, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 605 days.

(21) Appl. No.: 10/656,384

(22) Filed: Sep. 5, 2003

(65) Prior Publication Data
US 2005/0055564 A1 Mar. 10, 2005

(51) Int. Cl.
G06F 17/30 (2006.01)

(52) U.S. Cl. .................. 726/26; 713/165; 713/167; 717/126; 717/127

(58) Field of Classification Search .............. 726/1, 726/2, 22, 26–30; 713/164–167; 717/126, 717/127, 131, 140; 705/50, 62
See application file for complete search history.

(56) References Cited

U.S. PATENT DOCUMENTS

| | | | | |
|---|---|---|---|---|
| 5,222,134 A * | 6/1993 | Waite et al. | ............... | 705/59 |
| 5,559,884 A * | 9/1996 | Davidson et al. | ............ | 713/187 |
| 5,845,281 A * | 12/1998 | Benson et al. | .............. | 707/9 |
| 5,974,549 A * | 10/1999 | Golan | ......................... | 726/23 |
| 6,006,328 A * | 12/1999 | Drake | ......................... | 726/23 |
| 6,317,868 B1 * | 11/2001 | Grimm et al. | ............... | 717/127 |
| 6,367,012 B1 * | 4/2002 | Atkinson et al. | ............ | 713/176 |
| 6,405,202 B1 * | 6/2002 | Britton et al. | ............... | 707/9 |
| 6,405,316 B1 * | 6/2002 | Krishnan et al. | ............ | 713/190 |
| 6,622,300 B1 * | 9/2003 | Krishnaswamy et al. | .... | 717/130 |
| 6,643,775 B1 * | 11/2003 | Granger et al. | .............. | 713/190 |
| 6,668,325 B1 * | 12/2003 | Collberg et al. | ............ | 713/194 |
| 6,802,006 B1 * | 10/2004 | Bodrov | ...................... | 713/187 |
| 6,980,308 B2 * | 12/2005 | Masaki et al. | ............... | 358/1.14 |
| 7,181,603 B2 * | 2/2007 | Rothrock et al. | ............... | 713/1 |
| 2002/0077985 A1 * | 6/2002 | Kobata et al. | ................ | 705/51 |
| 2002/0099837 A1 * | 7/2002 | Oe et al. | ..................... | 709/229 |
| 2002/0138727 A1 * | 9/2002 | Dutta et al. | ................ | 713/167 |
| 2003/0028801 A1 * | 2/2003 | Liberman et al. | ........... | 713/200 |
| 2003/0188187 A1 * | 10/2003 | Uchida | ........................ | 713/200 |
| 2003/0200459 A1 * | 10/2003 | Seeman | ..................... | 713/200 |
| 2005/0010767 A1 * | 1/2005 | Craft | .......................... | 713/168 |
| 2006/0218539 A1 * | 9/2006 | Stiemens et al. | ............ | 717/140 |

* cited by examiner

*Primary Examiner*—Kimyen Vu
*Assistant Examiner*—Nirav Patel
(74) *Attorney, Agent, or Firm*—Woodcock Washburn LLP

(57) ABSTRACT

A persisted object model is loaded from an object model document comprising a compiled executable file having an image source, a security source, and a loader. The loader is instantiated, and instantiates the object model from the image source and a security agent from the security source to control access to the instantiated object model. The loader returns to a commander a first reference to the instantiated security agent, whereby the commander in employing the first reference accesses the security agent rather than the instantiated object model. A commander issues a command to the instantiated object model by way of the first reference to the security agent, and the security agent receives and reviews same according to pre-defined rules to determine whether the object model should in fact receive the command. If so, the security agent forwards the command to the object model.

23 Claims, 5 Drawing Sheets

OBJECT MODEL DOCUMENT FOR OBFUSCATING OBJECT MODEL THEREIN

TECHNICAL FIELD

This invention relates to an object model document such that the document may be executed by an appropriate application but that obfuscates the object model therein such that certain actions may not be taken with regard to the object model, such as saving the object model in a non-obfuscated form. More particularly, the invention relates to methods and mechanisms that achieve such obfuscation of such object model within the object model document.

BACKGROUND OF THE INVENTION

As may be appreciated, in the computer-related art, an object model is a collection of computer-type objects that are instantiated in a memory of a computer or the like, and includes state information relating to the objects, properties of objects, methods that can be performed with regard to the objects, relationships between the objects, and other pertinent information necessary to allow the object model to function to achieve an overall goal. Such object model may be created by or in combination with a particular computer application for execution thereon, or may be created by another computer application to be executed on the particular computer application.

Categories and varieties of such object model are many and varied. For example, the object model may represent the architectural specifications for a building as created by an architectural application. Similarly, the object model may represent the electrical and plumbing specifications for such building as created by a building services application. Likewise, the object model may represent design specifications for controlling a machine to produce a particular object as created by a machine-control application.

Significantly, at least with regard to the present disclosure, an object model in a memory of a computer or the like may be persisted as an object model document. That is, the present state of an object model may be saved in the form of a computer data file or the like and then re-loaded at a later time to re-create the object model in its former state. Methods and mechanisms for persisting an object model are known or should be apparent to the relevant public and therefore need not be described herein in any detail.

Note that an object model may be persisted as an object model document by a designer of the object model who wishes to suspend designing activity and then continue with such designing activity at a later time, for example. More notably, once the object model has been designed, it may be the case that the designer or a master of the designer may wish to persist the object model document and then sell, license, or otherwise convey (hereinafter 'sell') the persisted object model document as the object model to one or more interested purchasers. The purchaser might then apply the corresponding application to act upon information represented by the object model document.

One way to persist an object model as an object model document is to save the object model as an extensible markup language (XML) type document. However, it is to be appreciated that an XML-type object model document is in effect human-readable source code that describes the object model, where such source code can be viewed with ease by a purchaser and perhaps modified thereby. That is, such XML-type document containing the source code for the object model is not obfuscated. As may be appreciated, then, a seller of such an object model would not likely in fact sell the object model in such non-obfuscated form, because upon examination of the source code of the object model, the steps leading to ultimate achievement of whatever it is a particular object model document is designed to achieve would become evident. Thus, in many cases it is desirable to withhold such information while providing the ability to achieve the ultimate result.

Another way to persist an object model as an object model document is to save the object model as a programming-language type document, such as for example as a C-type programming language document. Of course, it is to be appreciated that a C-type programming language object model document is, like an XML-type object model document, in effect source code that describes the object model, where such source code is non-obfuscated and can be viewed with ease. Thus, and again, a seller of such an object model would not likely in fact sell the object model in such non-obfuscated form.

However, such C-type programming language object model document can be compiled by way of an appropriate compiler into an executable file. Moreover, and significantly, such executable file contains machine code which is in fact by its nature difficult to understand/obfuscated and if viewed or otherwise examined likely will not reveal the aforementioned source code for the object model embodied therein.

Such an executable file with the obfuscated object model embodied therein would seem to be amenable to the seller of such an object model. Critically, though, such executable file is designed to be executed upon the command of a corresponding computer application to instantiate the object model therein in a memory of a computer. More to the point, such computer application also very likely includes all functionality necessary to persist or save the instantiated object model in some non-obfuscated form, such as for example the aforementioned XML-type object model document or the aforementioned C-type programming language object model document.

Accordingly, a need exists for a method and mechanism that allows an object model to be persisted as an object model document, where the object model resides within the object model document in an obfuscated form and cannot be saved or otherwise improperly revealed in a non-obfuscated form. Moreover, a need exists for such a method and mechanism whereby the object model document with the obfuscated object model therein can be employed by any appropriate application without any special modification thereto.

SUMMARY OF THE INVENTION

The aforementioned needs are satisfied at least in part by the present invention in which a persisted object model is loaded from an object model document comprising a compiled executable file having an image source, a security source, and a loader. The loader is instantiated in a memory of a computer upon a command from a commander to execute the executable file to instantiate the persisted object model. The loader instantiates the object model in the memory from the image source, and instantiates a security agent in the memory from the security source. The security agent controls access to the object model as instantiated in the memory of the computer. The loader returns to the commander a first reference to the instantiated security agent, whereby the commander in employing the first reference accesses the security agent rather than the instantiated object model.

To process a command from a commander to the instantiated object model issued by way of the first reference to the security agent, the security agent receives such command and reviews same according to pre-defined rules therein to determine whether the object model should in fact receive the command. If so, the security agent forwards the command to the object model and the object model receives the command and executes same.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
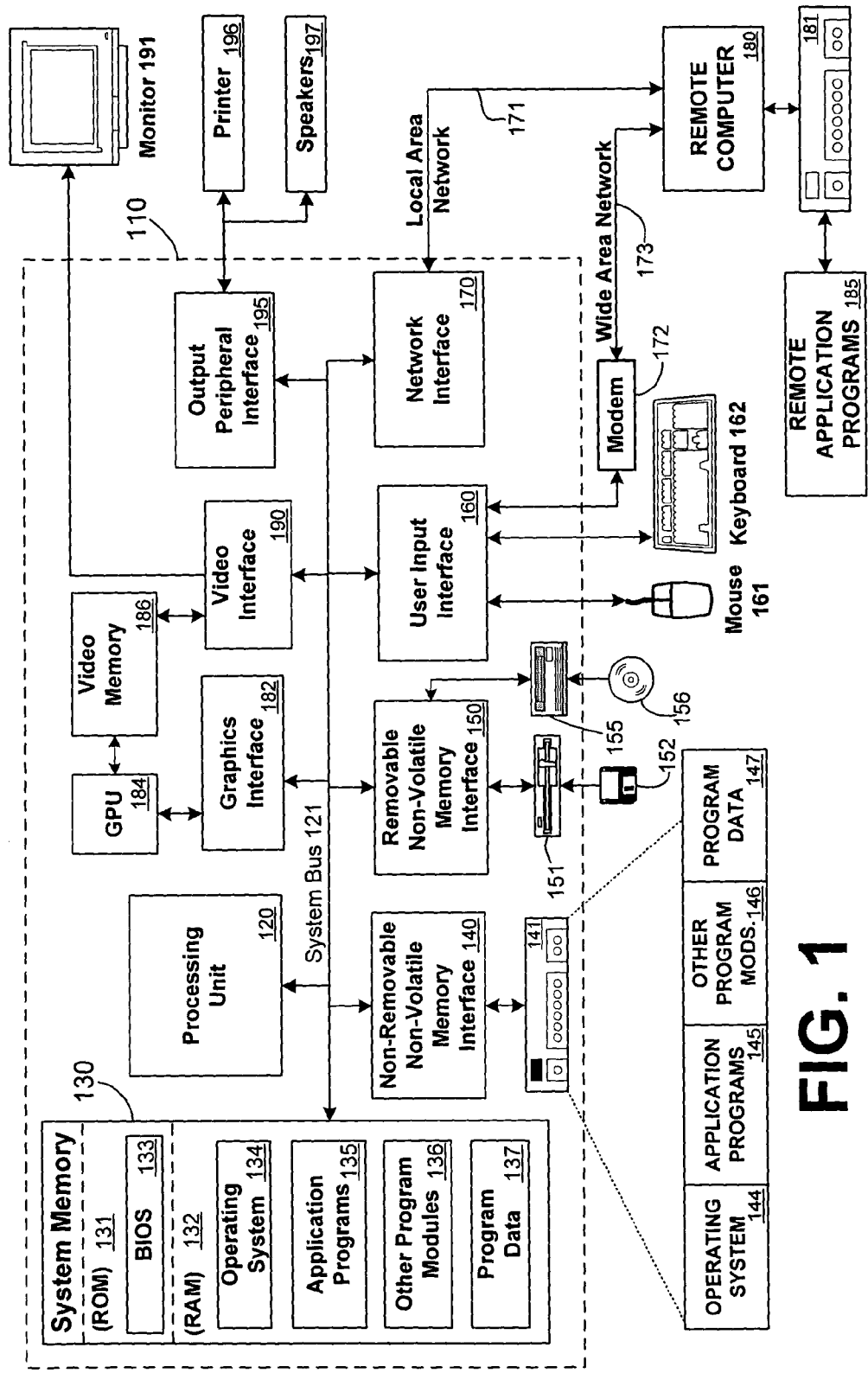
FIG. 1 is a block diagram representing an exemplary non-limiting computing environment in which the present invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of co-processing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may interact to implicate authentication techniques of the present invention for trusted graphics pipeline(s).

Figure 2:
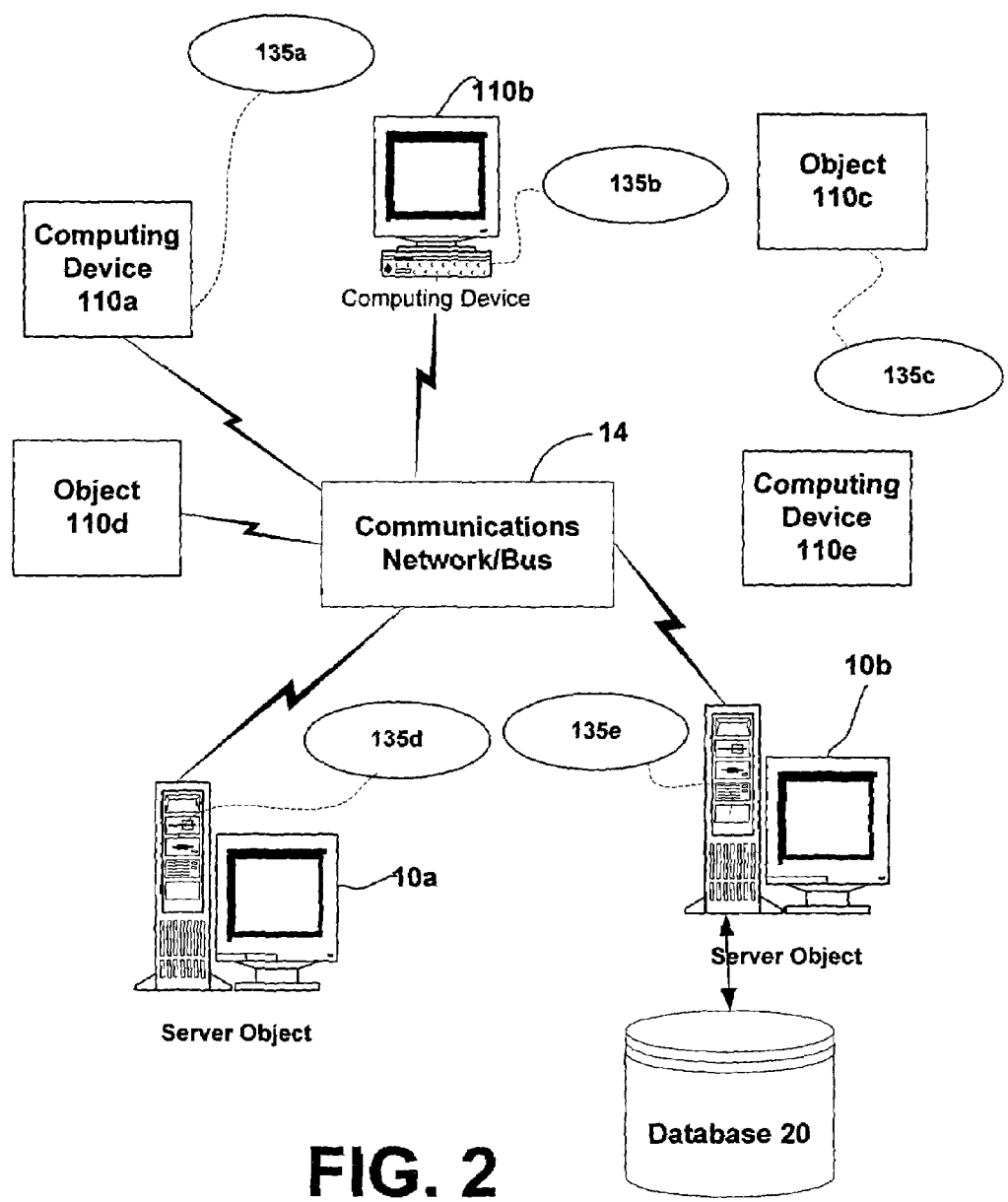
FIG. 2 is a block diagram representing an exemplary network environment having a variety of computing devices in which the present invention may be implemented.

FIG. 2 provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, televisions, personal computers, etc. Each object can communicate with another object by way of the communications network 14. This network may itself comprise other computing objects and computing devices that provide services to the system of FIG. 2. In accordance with an aspect of the invention, each object 10 or 110 may contain an application that might request the authentication techniques of the present invention for trusted graphics pipeline(s).

It can also be appreciated that an object, such as 110*c*, may be hosted on another computing device 10 or 110. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wireline or wireless systems, by local networks or widely distributed networks. Currently, many of the networks are coupled to the Internet, which provides the infrastructure for widely distributed computing and encompasses many different networks.

In home networking environments, there are at least four disparate network transport media that may each support a unique protocol such as Power line, data (both wireless and wired), voice (e.g., telephone) and entertainment media. Most home control devices such as light switches and appliances may use power line for connectivity. Data Services may enter the home as broadband (e.g., either DSL or Cable modem) and are accessible within the home using either wireless (e.g., HomeRF or 802.11 b) or wired (e.g., Home PNA, Cat 5, even power line) connectivity. Voice traffic may enter the home either as wired (e.g., Cat 3) or wireless (e.g., cell phones) and may be distributed within the home using Cat 3 wiring. Entertainment media may enter the home either through satellite or cable and is typically distributed in the home using coaxial cable. IEEE 1394 and DVI are also emerging as digital interconnects for clusters of media devices. All of these network environments and others that may emerge as protocol standards may be interconnected to form an intranet that may be connected to the outside world by way of the Internet. In short, a variety of disparate sources exist for the storage and transmission of data, and consequently, moving forward, computing devices will require ways of protecting content at all portions of the data processing pipeline.

The 'Internet' commonly refers to the collection of networks and gateways that utilize the TCP/IP suite of protocols, which are well-known in the art of computer networking. TCP/IP is an acronym for "Transport Control Protocol/Interface Program." The Internet can be described as a system of geographically distributed remote computer networks interconnected by computers executing networking protocols that allow users to interact and share information over the networks. Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer e.g., a server. In the example of FIG. 2, computers 110*a*, 110*b*, etc. can be thought of as clients and computer 10*a*, 10*b*, etc. can be thought of as the server where server 10*a*, 10*b*, etc. maintains the data that is then replicated in the client computers 110*a*, 110*b*, etc.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW). Typically, a computer network address such as a Universal Resource Locator (URL) or an Internet Protocol (IP) address is used to identify the server or client computers to each other. The network address can be referred to as a Universal Resource Locator address. For example, communication can be provided over a communications medium. In particular, the client and server may be coupled to one another via TCP/IP connections for high-capacity communication.

Thus, FIG. 2 illustrates an exemplary networked or distributed environment, with a server in communication with client computers via a network/bus, in which the present invention may be employed. In more detail, a number of servers 10*a*, 10*b*, etc., are interconnected via a communications network/bus 14, which may be a LAN, WAN, intranet, the Internet, etc., with a number of client or remote computing devices 110*a*, 110*b*, 110*c*, 110*d*, 110*e*, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to process, store or render secure content from a trusted source.

In a network environment in which the communications network/bus 14 is the Internet, for example, the servers 10 can be Web servers with which the clients 110*a*, 110*b*, 110*c*, 110*d*, 110*e*, etc. communicate via any of a number of known protocols such as HTTP. Servers 10 may also serve as clients 110, as may be characteristic of a distributed computing environment. Communications may be wired or wireless, where appropriate. Client devices 110 may or may not communicate via communications network/bus 14, and may have independent communications associated therewith. For example, in the case of a TV or VCR, there may or may not be a networked aspect to the control thereof. Each client computer 110 and server computer 10 may be equipped with various application program modules or objects 135 and with connections or access to various types of storage elements or objects, across which files may be stored or to which portion(s) of files may be downloaded or migrated. Thus, the present invention can be utilized in a computer network environment having client computers 110*a*, 110*b*, etc. that can access and interact with a computer network/bus 14 and server computers 10*a*, 10*b*, etc. that may interact with client computers 110a, 110b, etc. and other devices 111 and databases 20.

Obfuscating an Object Model Within an Object Model Document

Figure 3:
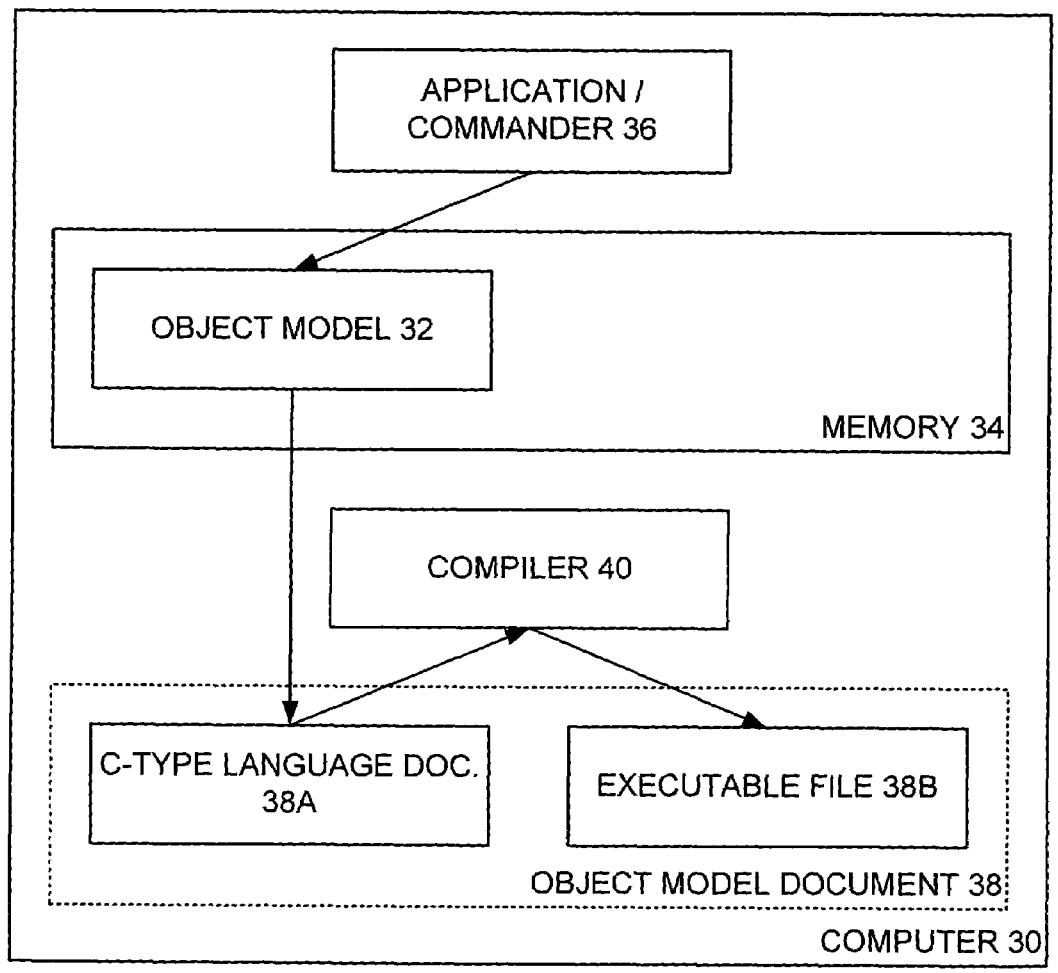
FIG. 3 is a block diagram showing an architecture whereby an object model may be persisted as an object model document.

Referring now to FIG. 3, it is seen that within the context of a computer or computer system 30 (hereinafter 'computer 30'), a developer, user, or the like has developed and/or instantiated an object model 32 in a memory 34 with the aid of an appropriate application 36. As was set forth above, the object model 32 is a collection of computer-type objects in the memory 34 of the computer 30, and includes state information relating to the objects, properties of objects, methods that can be performed with regard to the objects, relationships between the objects, and other pertinent information necessary to allow the object model to function to achieve an overall goal. Such object model 32 may be any appropriate object model without departing from the spirit and scope of the present invention. For example, the object model 32 may represent an architectural system, an electrical system, an engineering system, a computing system, a plumbing system, etc.

As was also set forth above, the object model 32 in the memory 34 of the computer 30 may be persisted as an object model document 38 by way of the application 36 or by way of another application. In particular, and in one embodiment of the present invention, the object model 32 may be saved as a programming-language type document 38a, such as for example as a C-type programming language document. Note, though, that the object model 32 may alternately be saved as any other type of programming language document or other type of document without departing from the spirit and scope of the present invention.

Again, the C-type programming language object model document 38a is in effect source code that describes the object model 32, where such source code is non-obfuscated and can be viewed with ease. Thus, in one embodiment of the present invention, such document 38a is compiled by way of an appropriate compiler 40 into an executable file 38b of machine code. As a result of such compiling, such executable file 38b is in fact obfuscated and if viewed or otherwise examined likely will not reveal the aforementioned source code for the object model 32 embodied therein.

However, such executable file 38b can be executed upon the command of the application 36 or by way of another application to instantiate the object model 32 therein in the memory 34 of the computer 30. Moreover, such application 36 likely includes all functionality necessary to persist or save the instantiated object model 32 in a non-obfuscated form. Accordingly, and in one embodiment of the present invention, the compiler 40 compiles the C-type programming language object model document 38a into the executable file 38b shown in FIG. 4.

Figure 4:
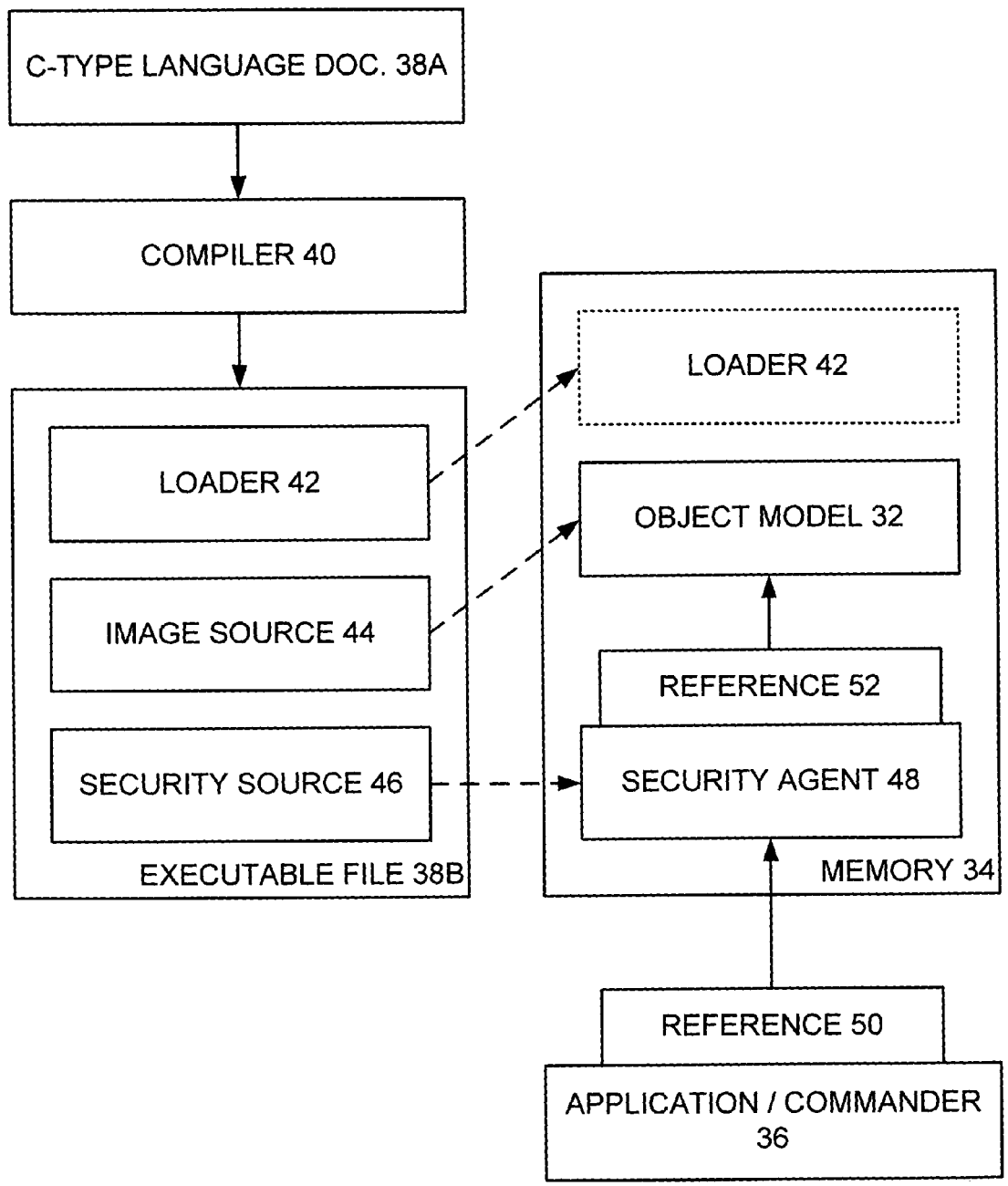
FIG. 4 is a block diagram showing the architecture of FIG. 3 in accordance with one embodiment of the present invention.

In particular, and turning now to FIG. 4, in one embodiment of the present invention, the executable file 38b is produced by the compiler 40 from the document 38b to have components including a loader 42, an image source 44 from which the object model 32 is to be instantiated in the memory 34 of the computer 30, and a security source 46 from which a security agent 48 is to be instantiated in the memory 34 of the computer 30.

As may be appreciated, the loader 42 of the executable file 38b of the present invention instantiates the object model 32 upon a command from the application 36 or another application (hereinafter 'the commander 36') to execute the executable file 38b. Essentially, and as is known, upon a command from the commander 36 to execute the executable file 38b, the loader 42 is instantiated in the memory 34 of the computer 30 for the purpose of loading all necessary components including the image source 44 to instantiate the object model 32 and the security source 46 to instantiate the security agent 48. The loader 42 includes all necessary instructions for loading the components as set forth by the compiler 40, including information such as which components are to be instantiated, when such components are to be instantiated, where such components are to be instantiated, etc. Significantly, upon loading all necessary components, the loader 42 returns to the commander 36 a reference 50 to a location in the memory 34 of the computer 30 where the commander 36 may access the object model 32 as instantiated therein. As may be appreciated, such reference 50 may be a pointer or the like. The loader 42 may be any appropriate loader without departing from the spirit and scope of the present invention, and is known or should be apparent to the relevant public and therefore need not be described herein in any detail.

In one embodiment of the present invention, the reference 50 returned by the loader 42 to the commander 36 is to the location in the memory 34 of the computer 30 where the loader 42 has instantiated the security agent 48 based on the security source 46 of the executable file 38b, and not the location in the memory 34 of the computer 30 where the loader 42 has instantiated the object model 32 based on the image source 44 of such executable file 38b. Accordingly, and as should be appreciated, the commander 36 in attempting to access the object model 32 in actuality accesses the security agent 48. As may now be appreciated, and as will be disclosed in more detail below, the security agent 48 in effect acts as a wrapper or guard that controls access to the object model 32 in a manner defined by the compiler 40 upon producing the executable file 38b. Thus, the commander 36 indirectly accesses the object model 32 by way of the reference 50 to the security agent 48 as received from the loader 42.

The object model 32 as instantiated by the loader 42 in the memory 34 of the computer 30 is thus not specially protected in any particular manner but for the fact that all access to the object model 32 as instantiated is by way of the instantiated security agent 48. Notably, inasmuch as the commander 36 does not have any reference directly to the object model 32, such commander 36 has no way of directly accessing the object model 32 and therefore cannot command the object model 32 to act, especially in any manner that the security agent 48 would not approve of.

In one embodiment of the present invention, the security agent 48 as instantiated by the loader 42 in the memory 34 of the computer 30 and as pointed to by the reference 50 is constructed by the compiler 40 to pass on each command from the commander 36 to the object model 32 as instantiated by the loader 42 in the memory 34 of the computer 30, unless such command is deemed to be of a type that should not be so passed on. As may be appreciated, one type of command that the security agent 48 should pass on to the object model 32 is any command that would normally be expected to be given to the object model 32 during the normal operation thereof and that does not act to expose the object model 32 in a non-obfuscated form. For example, the security agent 48 should allow any type of command that runs the object model 32 in the manner in which the object model 32 is expected to be run.

As may also be appreciated, and significantly, one type of command that the security agent 48 should not pass on to the object model 32 is any command that would allow the object model 32 to be saved in a non-obfuscated form. For example, the security agent 48 should 'intercept' or not pass on any type of command that saves the object model 32 as an XML-type object model document, as a C-type programming language object model document 38a, or as any other like non-obfuscated form.

Note that other types of commands exist that the security agent 48 should intercept from being passed on to the object model 32, and the security agent 48 may be constructed to intercept any type of command without departing from the spirit and scope of the present invention. For example, the security agent 48 may be constructed to intercept print commands if so desired. Also, if desired, the security agent 48 may be constructed to intercept certain types of commands if deemed to expose the object model 32 with too fine a granularity, such as for example, a print command that prints every detail of the object model 32. Alternatively, the security agent 48 may be constructed to intercept such a fine granularity command and substitute a lesser granularity command, such as for example, a print command that prints a less detailed version of the object model 32.

Significantly, in the present invention, although the commander 36 indirectly accesses the object model 32 by way of the reference 50 to the security agent 48 as received from the loader 42, such commander 36 need not be aware of such indirect access, and is not aware of such indirect access unless a command therefrom is intercepted by the security agent 48 and thus fails. Thus the present invention may be employed without any special modification to the commander 36.

The security agent 48 as heretofore set forth is instantiated separately from the object model 32 by the loader 42 in the memory 34 of the computer 30. However, the security agent 48 may also be instantiated as part of the object model 32 without departing from the spirit and scope of the present invention. Note, though, that to do so may require the compiler 40 to alter the image source 44 of the object model 32 during the process of compiling same to include therein the substance of the security source 46 of such security agent 48.

Notably, in the present invention, the instantiated security agent 48 behaves in all regards the same as an object model 32, and a commander 36 cannot and does not need to make a distinction regarding whether a security agent 48 or an object model 32 is being accessed at any point. However, by only allowing the commander 36 to access the security agent 48, the security agent 48 is in a position to exercise control over access to all of or portions of the object model 32. For any requested access from a commander 36 which is not deemed allowable by the security agent 48, such security agent 48 returns an error to the commander 36 without having allowed access to the object model 32.

Figure 5:
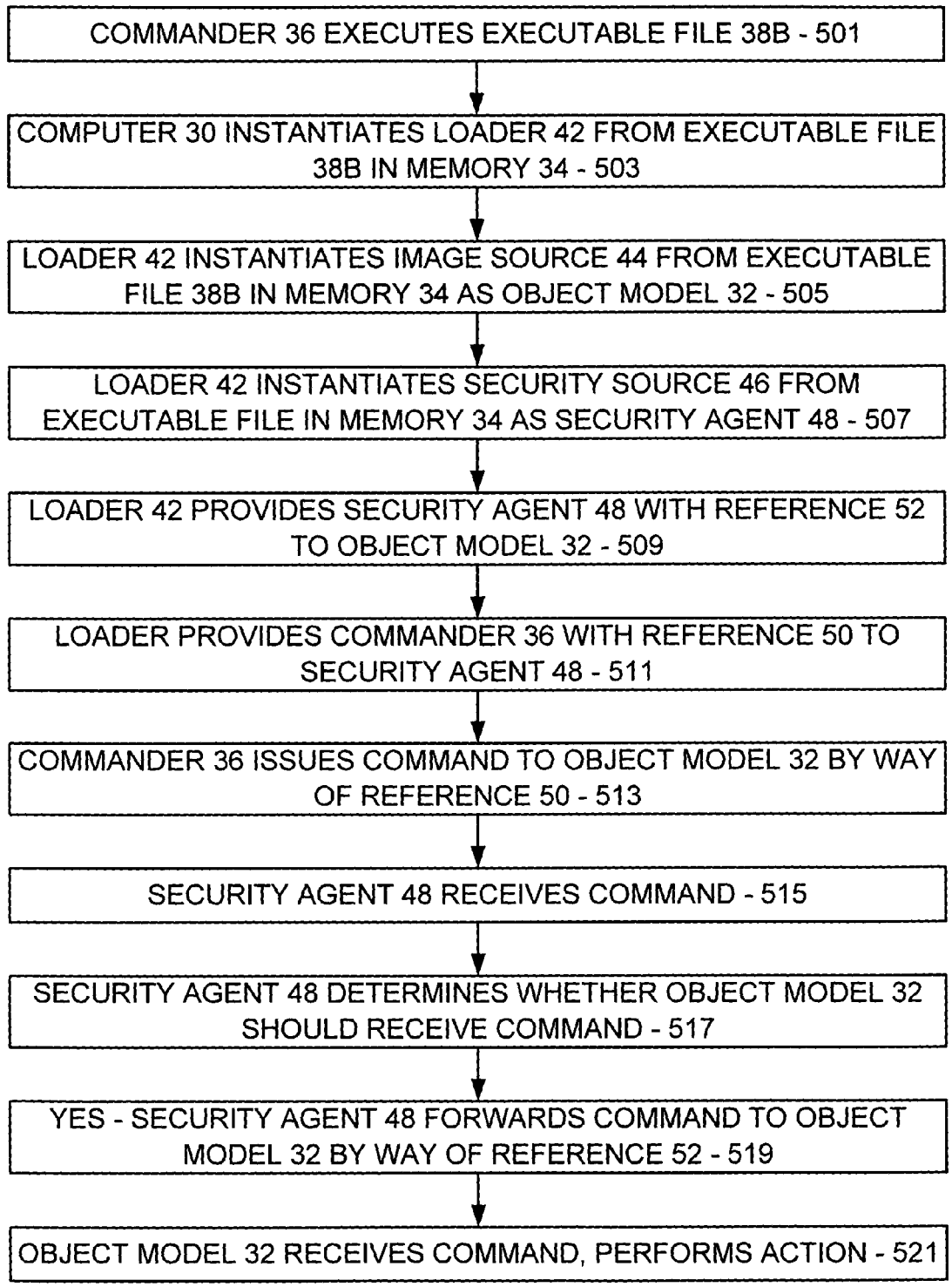
FIG. 5 is a flow diagram showing key steps performed in connection with the architecture of FIG. 4 in instantiating an object model from an object model document along with a security agent that intercepts certain types of commands to the instantiated object model in accordance with one embodiment of the present invention.

Turning now to FIG. 5, then, it is seen that in one embodiment of the present invention, the compiled executable file 38b of FIG. 4 as employed by a commander 36 executing same operates in the following manner. Preliminarily, the commander 36 in fact executes the executable file 38b (step 501) and in response thereto the operating system of the computer 30 finds the loader 42 in the executable file 38b and instantiates same in the memory 34 of the computer 30 or elsewhere (step 503). Thereafter, the loader 42 finds the image source 44 in the executable file 38b and instantiates same in the memory 34 as the object model 32 (step 505), and also finds the security source 46 in the executable file 38b and instantiates same in the memory 34 as the security agent 48 (step 507).

Notably, the loader 42 in instantiating the security agent 48 provides same with a reference 52 to the location of the object model 32 in the memory 34 of the computer 30 (step 509), and after instantiating the security agent 48 provides the reference 50 to the location of such security agent 48 in the memory 34 of the computer 30 to the commander 36 (step 511). As with the reference 50, reference 52 may be a pointer or the like.

Thus, the commander 36 upon receiving the reference 50 understands that a command may be issued to the object model 32 by way of such reference 50. Note, though, that as was set forth above, upon the commander 36 issuing such a command by way of such reference 50 (step 513), such command is in fact received by the security agent 48 (step 515).

Thus, the security agent 48 reviews the command according to pre-defined rules therein to determine whether the object model 32 should in fact receive the command (step 517), and if so the security agent 48 forwards the command to the object model 32 by way of the reference 52 (step 519). Otherwise, the security agent does not forward the command to the object model 32, but instead takes an alternate action, such as for example responding to the commander 36 with a message or the like to the effect that the command cannot be issued to the object model 32. At any rate, upon receiving a command from the security agent 48, the object model 32 performs whatever action is required based on such command and if necessary reports back to the commander 36, perhaps by way of the security agent 48 (step 521).

CONCLUSION

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the present invention, a method and mechanism are provided that allow an object model 32 to be persisted as an object model document 38b, where the object model 32 resides within the object model document 38b in an obfuscated form and cannot be saved or otherwise improperly revealed in a non-obfuscated form. The object model document 38d with the obfuscated object model 32 therein can be employed by any appropriate application 36 without any special modification thereto.

It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

The invention claimed is:

1. A computer system comprising:
an input device that receives a command input from a user to display information from an object model via a software application having an application commander;
a compiled executable file having an executable image file source, an executable security source, and an executable loader,
wherein upon a command from the commander to execute the executable file, a loader is instantiated in a memory of the computer using the executable loader, the loader instantiating in the memory of the computer (a) the object model using the executable image source, and (b) a security agent using the security source, the security agent controlling access to the object model as instantiated in the memory of the computer, and wherein the loader provides a first reference for the instantiated security agent to point to the object model and a second reference for the application commander to point to the instantiated security agent, and wherein, in response to an application request for information from the object model:
(i) the application commander accesses the security agent rather than the object model, and
(ii) the security agent limits access to the object model before accessing the requested information from the object model using the second reference; and
a computer monitor that displays the requested information, wherein the requested information from the object model is provided by the security agent to the application commander if the request for information does not act to expose the object model in a non-obfuscated form.

2. The system of claim 1, wherein the executable file is compiled by a compiler from a C-type programming language object model document.

3. The system of claim 1, wherein the instantiated security agent passes on each command from the commander to the object model unless such security agent deems such command to be of a type that should not be so passed on.

4. The system of claim 1, wherein the security agent does not pass on to the object model a type of command that would expose the object model in a non-obfuscated form.

5. The system of claim 1, wherein the security agent does not pass on to the object model a type of command that would expose the object model with a level of granularity finer than a pre-defined maximum.

6. The system of claim 1, wherein the security agent passes on to the object model a substitute command that exposes the object model with a level of granularity coarser than the pre-defined maximum.

7. The system of claim 1, wherein the loader instantiates the security agent separately from the object model.

8. The system of claim 1, wherein the loader instantiates the security agent as part of the object model.

9. A method for loading a persisted object model from an object model document, the method comprising:
providing a compiled executable file having an image source, a security source, and a loader;
instantiating the loader in a memory of a computer upon a command from a commander to execute the executable file to instantiate the persisted object model;
the loader instantiating the object model in the memory from the image source;
the loader instantiating a security agent in the memory from the security source, the security agent limiting access to the object model as instantiated in the memory of the computer, wherein the security agent does not allow the object model to be exposed in a non-obfuscated form;
the loader returning to the commander a first reference to the instantiated security agent, whereby the commander in employing the first reference accesses the security agent rather than the instantiated object model; and
the loader, upon instantiating the security agent, providing same with a second reference to the instantiated object model, whereby the commander does not have the second reference and therefore cannot directly access the object model or command same to act.

10. The method of claim 9 further comprising the instantiated security agent passing on each command from the commander to the object model unless such security agent deems such command to be of a type that should not be so passed on.

11. The method of claim 10 comprising the security agent not passing on to the object model a type of command that would expose the object model in a non-obfuscated form.

12. The method of claim 10 comprising the security agent not passing on to the object model a type of command that would expose the object model with a level of granularity finer than a pre-defined maximum.

13. The method of claim 12 comprising the security agent passing on to the object model a substitute command that exposes the object model with a level of granularity coarser than the pre-defined maximum.

14. The method of claim 9 comprising the loader instantiating the security agent separately from the object model.

15. The method of claim 9 comprising the loader instantiating the security agent as part of the object model.

16. A computer-readable storage medium having stored thereon instructions, which when executed:
instantiate a loader for an object model document for persisting an object model therein and enable a commander to indirectly access the object model, the object model document comprising a compiled executable file having an executable image source file, an executable security source, and an executable loader, the instructions comprising:
instantiating the loader in memory of a computer using the executable loader, the loader instantiating in the memory of the computer:
(a) the persisted object model in the memory of the computer using the executable image source and
(b) a security agent in the memory of the computer using the executable security source, wherein the security agent limits access to the object model as instantiated in the memory of the computer such that the security agent does not allow the object model to be exposed in a non-obfuscated form; and wherein the instructions return to the commander a first reference to the instantiated security agent, whereby the commander in employing the first reference accesses the security agent rather than the instantiated object model, wherein the loader upon instantiating the security agent provides same with a second reference to the instantiated object model, whereby the commander does not have the second reference and therefore cannot directly access the object model or command same to act.

17. The medium of claim 16 wherein the executable file is compiled by a compiler from a C-type programming language object model document.

18. The medium of claim 16 wherein the instantiated security agent passes on each command from the commander to the object model unless such security such security agent deems such command to be of a type that should not be so passed on.

19. The medium of claim 18 wherein the security agent does not pass on to the object model a type of command that would expose the object model in a non-obfuscated form.

20. The medium of claim 18 wherein the security agent does not pass on to the object model a type of command that would expose the object model with a level of granularity finer than a pre-defined maximum.

21. The medium of claim 20 wherein the security agent passes on to the object model a substitute command that exposes the object model with a level of granularity coarser than the pre-defined maximum.

22. The medium of claim 16 wherein the loader instantiates the security agent separately from the object model.

23. The medium of claim 16 wherein the loader instantiates the security agent as part of the object model.

* * * * *